(12) United States Patent
Pourrezaei Khaligh et al.

(10) Patent No.: US 11,964,659 B2
(45) Date of Patent: Apr. 23, 2024

(54) SYSTEM AND METHOD FOR DETERMINING A HITCH ANGLE FOR CONTROLLING A VEHICLE WITH ACTIVE REAR STEERING

(71) Applicant: GM GLOBAL TECHNOLOGY OPERATIONS LLC, Detroit, MI (US)

(72) Inventors: Sepehr Pourrezaei Khaligh, Markham (CA); Akram M. Abdel-Rahman, Ajax (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 225 days.

(21) Appl. No.: 16/891,186

(22) Filed: Jun. 3, 2020

(65) Prior Publication Data
US 2021/0380109 A1 Dec. 9, 2021

(51) Int. Cl.
| | | |
|---|---|---|
| *B60W 30/18* | (2012.01) | |
| *B60W 10/18* | (2012.01) | |
| *B60W 10/20* | (2006.01) | |
| *B60W 40/10* | (2012.01) | |
| *B60W 50/14* | (2020.01) | |

(52) U.S. Cl.
CPC ...... *B60W 30/18036* (2013.01); *B60W 10/18* (2013.01); *B60W 10/20* (2013.01); *B60W 40/10* (2013.01); *B60W 50/14* (2013.01); *B60W 2050/146* (2013.01); *B60W 2300/14* (2013.01); *B60W 2510/205* (2013.01); *B60W 2520/10* (2013.01); *B60W 2520/22* (2013.01); *B60W 2554/802* (2020.02)

(58) Field of Classification Search
CPC .......... B60W 30/18036; B60W 50/14; B60W 2050/146; B60W 2300/14; B60W 2520/22
See application file for complete search history.

(56) References Cited

U.S. PATENT DOCUMENTS

| | | | |
|---|---|---|---|
| 9,731,568 B2 | 8/2017 | Wuergler et al. | |
| 10,173,722 B2 | 1/2019 | Pourrezaei Khaligh et al. | |
| 10,282,074 B2 | 5/2019 | Murad et al. | |
| 10,549,694 B2 | 2/2020 | Murad et al. | |
| 2005/0055138 A1 | 3/2005 | Lee et al. | |
| 2013/0179038 A1* | 7/2013 | Goswami | B62D 5/04 701/42 |
| 2014/0005918 A1* | 1/2014 | Qiang | B60D 1/245 701/300 |

(Continued)

FOREIGN PATENT DOCUMENTS

| | | |
|---|---|---|
| CN | 111094083 A | 5/2020 |
| JP | 2020011684 A | 1/2020 |

OTHER PUBLICATIONS

Chinese Office Action for Chinese Application No. 202110341268.1 dated Sep. 5, 2023.

*Primary Examiner* — Jelani A Smith
*Assistant Examiner* — Toya Pettiegrew

(57) ABSTRACT

One general aspect includes a system having a memory configured to include one or more executable instructions and a processor configured to execute the executable instructions, where the executable instructions enable the processor to estimate a rate of change of a hitch angle between a trailer and vehicle, the estimated rate of change of the hitch angle being based on a turn angle for a plurality of rear wheels of the vehicle as well as a speed of the vehicle.

17 Claims, 6 Drawing Sheets

(56) References Cited

U.S. PATENT DOCUMENTS

| | | | |
|---|---|---|---|
| 2014/0297128 A1* | 10/2014 | Lavoie | B60W 30/18036 |
| | | | 701/41 |
| 2015/0344067 A1* | 12/2015 | Lavoie | B62D 13/06 |
| | | | 701/41 |
| 2016/0031482 A1* | 2/2016 | Lavoie | B60W 30/18036 |
| | | | 701/41 |
| 2016/0059889 A1* | 3/2016 | Herzog | B62D 15/027 |
| | | | 701/41 |
| 2019/0276078 A1 | 9/2019 | Pourrezaei Khaligh et al. | |
| 2019/0283803 A1* | 9/2019 | Auner | H04N 7/183 |
| 2020/0317267 A1* | 10/2020 | Maruoka | G08G 1/16 |
| 2020/0406967 A1* | 12/2020 | Yunus | B62D 15/028 |

* cited by examiner

SYSTEM AND METHOD FOR DETERMINING A HITCH ANGLE FOR CONTROLLING A VEHICLE WITH ACTIVE REAR STEERING

INTRODUCTION

Driver assistance systems have been developed to assist vehicle operators (drivers) in towing a trailer. For example, these assistance systems can predict hitch angles and produce guidance graphics while a vehicle and trailer are moving in reverse. However, unfortunately, these driver assistance systems only take into account vehicles that implement front wheel steering functionality. Such driver assistance systems are incompatible with vehicles incorporating active rear steering systems. As follows, when the rear wheels of a vehicle are operatively rotated, to deliver greater stability and control, to park the vehicle and trailer, and to operate off-road trailering, known driver assistance system modules cannot properly predict the hitch angles of the trailer and thus cannot provide accurate steering assistance as well as guidance graphics on one or more displays within the vehicle's interior. For example, these inaccurate driver assistance system modules will create overlay mismatching and glitching in the views of any invisible trailer features and trailer turn aid features incorporated into the vehicle. It is therefore desirable to provide a system and method that will facilitate accurate driver (user) assistance when towing a trailer (forward and in reverse) with a vehicle that incorporates an active rear steering system. Moreover, other desirable features and characteristics of the present invention will become apparent from the subsequent detailed description of the invention and the appended claims, taken in conjunction with the accompanying drawings and this background of the invention.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system having a memory configured to include one or more executable instructions and a processor configured to execute the executable instructions, where the executable instructions enable the processor to estimate a rate of change of a hitch angle between a trailer and vehicle, the estimated rate of change of the hitch angle being based on a turn angle for a plurality of rear wheels of the vehicle as well as a speed of the vehicle. Other embodiments of this aspect include corresponding computer systems, apparatus, and computer programs recorded on one or more computer storage devices, each configured to perform the actions of the methods.

1. Implementations may include one or more of the following features. The system where the estimated rate of change of the hitch angle is based on the following relationship:

$$\dot{\theta} = \frac{V_C}{l_{tr}}\sin(\alpha - \theta_{prev}) - \omega\left(\frac{l_h}{l_{tr}}\cos\theta_{prev} + 1\right)$$

where θ_dot is the estimated rate of change of the hitch angle, $\theta_{prev}$ is a previous hitch angle, α is a rear wheel steer angle, ω is an angular velocity of the vehicle, $V_c$ is the speed of the vehicle, $l_h$ is a distance from a rear axle of the vehicle to a trailer hitch of the vehicle, and $l_{tr}$ is a distance from a trailer hitch of the vehicle to an axle of the trailer. The system where the executable instructions further enable the processor to predict a first curvature radius of a movement of the vehicle and trailer based on a previous hitch angle; and predict a second curvature radius of the movement of the vehicle and trailer based on the estimated rate of change of the hitch angle. The system where: the first curvature radius and the second curvature radius are based on the following relationships: $R_B=(l_h \cos\alpha + l_{tr} \cos(\alpha-\theta_{prev}))/\sin(\alpha-\theta_{prev})$ and $R_Y=(l_h \cos\alpha + l_{tr} \cos(\alpha-\theta_d))/\sin(\alpha-\theta_d)$ where $R_B$ is the first curvature radius, $R_Y$ is the second curvature radius, $\theta_d$ is a predicted hitch angle at a selected distance from a current location of the trailer, α is a rear-wheel steer angle, $l_h$ is a distance from a rear axle of the vehicle to a trailer hitch of the vehicle, and $l_{tr}$ is a distance from a trailer hitch of the vehicle to an axle of the trailer. The system where the executable instructions further enable the processor to generate a viewable trailer reverse trajectory view based on the estimated rate of change of the hitch angle, the trailer reverse trajectory configured to provide one or more virtual lines on a camera view to assist a driver to control motion of the trailer. The system where the executable instructions further enable the processor to control an active rear steering actuator based on the estimated rate of change of the hitch angle in order to steer the vehicle so as to assist a vehicle operator. The system where the executable instructions further enable the processor to control one or more friction brakes of the vehicle and/or one or more friction brakes of the trailer based on the estimated rate of change of the hitch angle in order to support the control an active rear steering actuator. Implementations of the described techniques may include hardware, a method or process, or computer software on a computer-accessible medium.

One general aspect includes a non-transitory machine-readable medium having stored thereon executable instructions adapted to estimate a rate of change of a hitch angle, which when provided to a processor and executed thereby, causes the processor to: estimate a rate of change of the hitch angle between a trailer and vehicle, the estimated rate of change of the hitch angle being based on a turn angle for a plurality of rear wheels of the vehicle as well as a speed of the vehicle. Other embodiments of this aspect include corresponding computer systems, apparatus, and computer programs recorded on one or more computer storage devices, each configured to perform the actions of the methods.

Implementations may include one or more of the following features. The non-transitory machine-readable medium where the estimated rate of change of the hitch angle is based on the following relationship:

$$\dot{\theta} = \frac{V_C}{l_{tr}}\sin(\alpha - \theta_{prev}) - \omega\left(\frac{l_h}{l_{tr}}\cos\theta_{prev} + 1\right)$$

where θ_dot is the estimated rate of change of the hitch angle, $\theta_{prev}$ is a previous hitch angle, α is a rear wheel steer angle, ω is an angular velocity of the vehicle, Vc is the speed of the vehicle, $l_h$ is a distance from a rear axle of the vehicle to a trailer hitch of the vehicle, and $l_{tr}$ is a distance from a trailer hitch of the vehicle to an axle of the trailer. The non-transitory machine-readable medium further including that the processor will predict a first curvature radius of a movement of the vehicle and trailer based on a previous hitch angle; and predict a second curvature radius of the movement of the vehicle and trailer based on the estimated rate of change of the hitch angle. The non-transitory machine-readable medium where: the first curvature radius and the second curvature radius are based on the following relationships: $R_B=(l_h \cos \alpha + l_{tr} \cos(\alpha-\theta_{prev}))/\sin(\alpha-\theta_{prev})$ and $R_Y=(l_h \cos \alpha + l_{tr} \cos(\alpha-\theta_d))/\sin(\alpha-\theta_d)$ where $R_B$ is the first curvature radius, $R_Y$ is the second curvature radius, $\theta_d$ is a predicted hitch angle at a selected distance from a current location of the trailer, $\alpha$ is a rear-wheel steer angle, $l_h$ is a distance from a rear axle of the vehicle to a trailer hitch of the vehicle, and $l_{tr}$ is a distance from a trailer hitch of the vehicle to an axle of the trailer. The non-transitory machine-readable medium further that the processor will generate a viewable trailer reverse trajectory view based on the estimated rate of change of the hitch angle, the trailer reverse trajectory configured to provide one or more virtual lines on a camera view to assist a driver to control motion of the trailer. The non-transitory machine-readable medium further including that the processor will control an active rear steering actuator based on the estimated rate of change of the hitch angle in order to steer the vehicle so as to assist a vehicle operator. The non-transitory machine-readable medium further including that the processor will control one or more friction brakes of the vehicle and/or one or more friction brakes of the trailer based on the estimated rate of change of the hitch angle in order to support the control an active rear steering actuator. Implementations of the described techniques may include hardware, a method or process, or computer software on a computer-accessible medium.

One general aspect includes a method including: estimating a rate of change of a hitch angle between a trailer and vehicle, the estimated rate of change of the hitch angle being based on a turn angle for a plurality of rear wheels of the vehicle as well as a speed of the vehicle. Other embodiments of this aspect include corresponding computer systems, apparatus, and computer programs recorded on one or more computer storage devices, each configured to perform the actions of the methods.

Implementations may include one or more of the following features. The method where the estimated rate of change of the hitch angle is based on the following relationship:

$$\dot{\theta} = \frac{V_C}{l_{tr}} \sin(\alpha - \theta_{prev}) - \omega \left( \frac{l_h}{l_{tr}} \cos \theta_{prev} + 1 \right)$$

where θ_dot is the estimated rate of change of the hitch angle, $\theta_{prev}$ is a previous hitch angle, $\alpha$ is a rear wheel steer angle, $\omega$ is an angular velocity of the vehicle, $V_c$ is the speed of the vehicle, $l_h$ is a distance from a rear axle of the vehicle to a trailer hitch of the vehicle, and $l_{tr}$ is a distance from a trailer hitch of the vehicle to an axle of the trailer. The method further including the steps of predicting a first curvature radius of a movement of the vehicle and trailer based on a previous hitch angle; and predicting a second curvature radius of the movement of the vehicle and trailer based on the estimated rate of change of the hitch angle. The method where: the first curvature radius and the second curvature radius are based on the following relationships: $R_B=(l_h \cos \alpha + l_{tr} \cos(\alpha-\theta_{prev}))/\sin(\alpha-\theta_{prev})$ and $R_Y=(l_h \cos \alpha + l_{tr} \cos(\alpha-\theta_d))/\sin(\alpha-\theta_d)$ where $R_B$ is the first curvature radius, $R_Y$ is the second curvature radius, $\theta_d$ is a predicted hitch angle at a selected distance from a current location of the trailer, $\alpha$ is a rear-wheel steer angle, $l_h$ is a distance from a rear axle of the vehicle to a trailer hitch of the vehicle, and $l_{tr}$ is a distance from a trailer hitch of the vehicle to an axle of the trailer. The method further including the step of generating a viewable trailer reverse trajectory view based on the estimated rate of change of the hitch angle, the trailer reverse trajectory configured to provide one or more virtual lines on a camera view to assist a driver to control motion of the trailer. The method further including the step of controlling an active rear steering actuator based on the estimated rate of change of the hitch angle in order to steer the vehicle so as to assist a vehicle operator. Implementations of the described techniques may include hardware, a method or process, or computer software on a computer-accessible medium.

The above features and advantages and other features and advantages of the present teachings are readily apparent from the following detailed description for carrying out the teachings when taken in connection with the accompanying drawings.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A vehicle control system according to the present disclosure determines the hitch angle using both a kinematic model and an input from one or more sensors, and assists a driver of a vehicle including active rear steering (ARS) based on the hitch angle that is determined. In one example, the vehicle control system determines a corrected hitch angle based on a measured hitch angle and an estimated rate of change of the hitch angle, and assists the driver based on the corrected hitch angle. In another example, the vehicle control system determines the corrected hitch angle based on the measured and estimated rate of change of the hitch angles using a Kalman filter.

The vehicle control system determines the estimated rate of change of the hitch angle based on a rear-wheel steer angle of the vehicle, the speed of the vehicle at the center of the rear axle, and the angular velocity of the vehicle via a kinematic model of the vehicle and the trailer.

Figure 1:
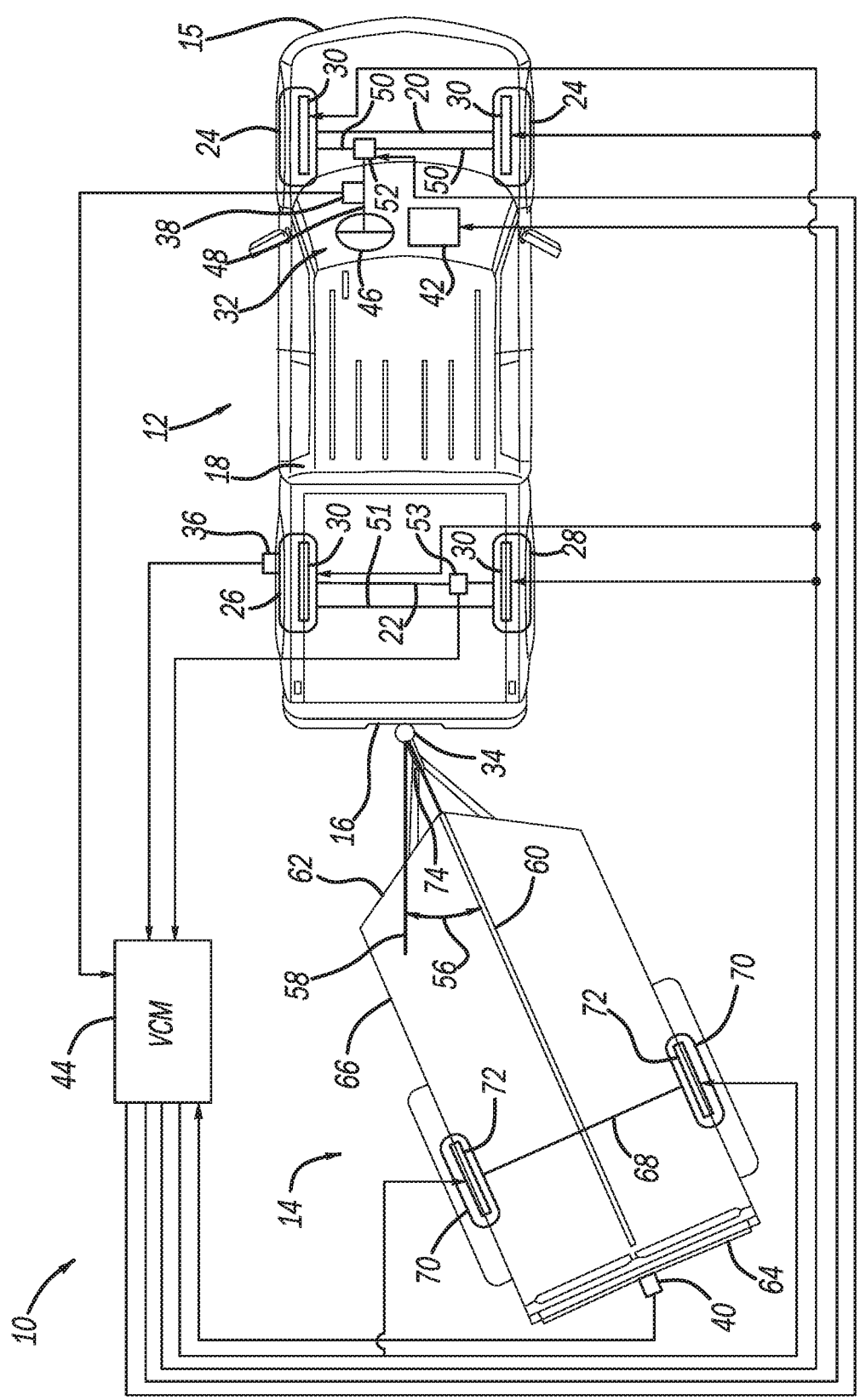
FIG. 1 is a schematic of an example vehicle system capable of utilizing the system and method disclosed herein.

Referring now to FIG. 1, a vehicle system 10 includes a vehicle 12 and a trailer 14. The vehicle 12 has a front end 15 and a rear end 16. The vehicle 12 includes a frame or body 18, a front axle 20, a rear axle 22, front wheels 24, a left rear wheel 26, a right rear wheel 28, friction brakes 30, a steering system 32, and a trailer hitch 34. The vehicle 12 further includes a rear wheel speed sensor 36, a steering wheel angle sensor 38, a user interface device 42, and a vehicle control module (VCM) 44.

The front axle 20 may refer to one or more shafts that extend between and are rotatably coupled to the front wheels 24. Similarly, the rear axle 22 may refer to one or more shafts that extend between and are rotatably coupled to the left and right rear wheels 26 and 28.

The friction brakes 30 are mounted to the front wheels 24 and to the left and right rear wheels 26 and 28. The friction brakes 30 resist rotation of the wheels 24, 26, and 28 when the friction brakes 30 are applied. The friction brakes 30 may include drum brakes and/or disc brakes, and may include electrohydraulic actuators and/or electromechanical actuators that press a brake pad against a brake disc and/or drum when the friction brakes 30 are applied.

The steering system 32 is operable to turn the left and right front wheels 26 and 28 and thereby turn the vehicle 12. The steering system 32 includes a steering wheel 46, a steering column 48, one or more steering linkages 50, a steering actuator 52, one or more ARS linkages 51, and an active rear steering actuator 53. A driver rotates the steering wheel 46 to turn the vehicle 12 left or right. The steering column 48 is coupled to the steering wheel 46 so that the steering column 48 rotates when the steering wheel 46 is rotated. The steering column 48 may also be coupled to the steering linkages 50 so that rotation of the steering column 48 causes translation of the steering linkages 50. The steering linkages 50 are coupled to the front wheels 24 so that translation of the steering linkages 50 turns the front wheels 24.

The steering actuator 52 is coupled to the steering linkages 50 and is operable to translate the steering linkages 50 and thereby turn the front wheels 24. The steering actuator 52 may be an electrohydraulic and/or electromechanical actuator. If the steering column 48 is coupled to the steering linkages 50, the steering actuator 52 may reduce the amount of effort that the driver must exert to turn the vehicle 12 left or right. In various implementations, the steering column 48 may not be coupled to the steering linkages 50, and the steering actuator 52 may translate the steering linkages 50 in response to an electronic signal that is generated based on the angular position of the steering wheel 46. When the steering actuator 52 is electronically controlled in this way, the steering system 32 may be referred to as a steer-by-wire system.

Similar to the steering actuator 52, discussed above, the active rear steering actuator 53 is coupled to ARS linkages 51 and is operable to translate ARS linkages 51 and thereby angularly turn the right and left rear wheels 26 and 28. The active rear steering actuator 53 may be an electrohydraulic and/or electromechanical actuator. In various implementations, the active rear steering actuator 53 is operatively connected to steering column 48, and/or steering actuator 52, which may be via wireless communications. As such, active rear steering actuator 53 may translate the ARS linkages 51 in response to an electronic signal that is generated based on the angular position of the steering wheel 46. Moreover, active rear steering actuator 53 may translate the ARS linkages 51 such that the right and left rear wheels 26 and 28 turn in an opposite direction as the front wheels 26. As such, the right and left rear wheels 26 have an inverse turning relationship with the front wheel 24 (as can be seen with additional reference to FIG. 3). The active rear steering actuator 53 may have an embedded rear steering sensor designed to measure the angular position of the right and left rear wheels 26 and 28 relative to a predetermined position. The rear steering angle sensor may alternatively be a stand-alone component mounted to ARS linkages 51, the rear axle, or the steering column 48 (or may be embedded within steering wheel angle sensor 38). When mounted to steering column 48, the rear steering wheel angle sensor may include a Hall Effect sensor that measures the angular position of a shaft that is disposed within the steering column 48 and rotatably coupled to the steering wheel 46.

The wheel speed sensor 36 is mounted to the left rear wheel 26 and measures the speed of the left rear wheel 26 (e.g., in meters per second m/s). Although the wheel speed sensor 36 is shown mounted to the left rear wheel 26, the wheel speed sensor 36 may measure the speed of another wheel of the vehicle 12 (e.g., right rear wheel 28). In various implementations, the vehicle 12 may include a speed sensor along ARS linkages 51 or at the center of the rear axle to measure the speed at the center of the rear axle of vehicle 12.

The steering wheel angle sensor 38 measures the angular position of the steering wheel 46 relative to a predetermined position. The steering wheel 46 may be in the predetermined position when the vehicle 12 is traveling in a straight line. The steering wheel angle sensor 38 may be mounted to the steering column 48 and may include a Hall Effect sensor that measures the angular position of a shaft that is disposed within the steering column 48 and rotatably coupled to the steering wheel 46.

A camera 40 may be permanently mounted on one of the side mirrors of vehicle 12 (not shown), to the rear end 64 of the trailer 14, or on the roof of trailer 14. Camera 40 may capture one or more images of the area behind trailer 14. The user interface device 42 may include an electronic display (e.g., a touchscreen) that is within the view of the driver and is operable to display text and/or images. In addition, the user interface device 42 may include a heads-up display (HUD) that, for example, projects text and/or images onto a windshield (not shown) of the vehicle 12. Further, the user interface device 42 may include one or more vibrators mounted to, for example, the steering wheel 46 and/or the driver's seat (not shown) to provide haptic feedback to the driver. Moreover, the user interface device 42 may include a speaker that is operable to generate a sound or audible message within the vehicle 12.

The VCM 44 estimates a rate of change of a hitch angle 56 (i.e., an angle between a longitudinal axis 58 of the vehicle 12 and a longitudinal axis 60 of the trailer 14) and assists the vehicle operator (driver/user) in various ways associated with, for example, preventing/avoiding a jackknifing scenario while reversing the vehicle 12 based on the estimated rate of change of the hitch angle. The VCM 44 may assist the driver by controlling the user interface device 42 to instruct the driver when to turn and/or brake the vehicle 12, which direction to turn the vehicle 12, and/or how much to turn and/or brake the vehicle 12. Additionally or alternatively, the VCM 44 may assist the driver by controlling the user interface device 42 to generate a combined rearview image that represents an area behind vehicle 12 while mitigating interference caused by the trailer 14. Additionally or alternatively, the VCM 44 may assist the driver by automatically turning and/or decelerating the vehicle 12 (e.g., by applying the friction brakes 30 and/or turning the front wheels 24 and/or left and right rear wheels 26 and 28 independent of an input from the driver). The VCM 44 may automatically turn and/or decelerate the vehicle 12 in order to prevent the jackknifing scenario while the vehicle is in reverse as well as provide added stability and control while towing trailer 14 (which may include both on-road trailering applications and off-road trailering applications). The VCM 44 also estimates the rate of change of the hitch angle 56 based on a turn angle for the right and left rear wheels 26 and 28 as well as the speed of the vehicle 12, which may be sensed at the center of rear axle 22 (discussed below). In addition, the VCM 44 may incorporate an Internal Measurement Unit (IMU) that measures a specific force, angular rate, and orientation of the vehicle 12, which may be via a combination of accelerometers, gyroscopes, and magnetometers.

The trailer 14 has a front end 62 and rear end 64. Camera 40 may capture images of an area located directly behind the rear end 64 of the trailer 14. The trailer 14 includes a frame or body 66, an axle 68, wheels 70, friction brakes 72, and a tongue 74. Although the trailer 14 is depicted as a two-wheel trailer, the principles of the present application apply to a trailer having more than two wheels. The axle 68 may refer to one or more shafts that extend between and are rotatably coupled to the wheels 70, or the axle 68 may simply refer the wheels 70.

The friction brakes 72 are mounted to the wheels 70 and resist rotation of the wheels 70 when the friction brakes 72 are applied. The friction brakes 72 may include drum brakes and/or disc brakes, and may include electrohydraulic actuators and/or electromechanical actuators that press a brake pad against a brake disc and/or drum when the friction brakes 72 are applied. The tongue 74 may be placed onto the trailer hitch 34 of the vehicle 12 to couple the trailer 14 to the vehicle 12. For example, the trailer hitch 34 may include a ball, and the tongue 74 may include a socket that receives and latches onto the ball of the trailer hitch 34 to couple the trailer 14 to the vehicle 12. Hitch 34 may also include a sensor to sense a hitch angle, which for purposes herein can be considered the previous hitch angle ($\theta_{prev}$) sensed at a time taken prior to rotation of rear wheels 26 and 28 (i.e., taken at a time $T_0$). Skilled artists will see that the hitch angle can generally be thought of as an articulation angle of trailer 14.

As discussed above, the VCM 44 may assist the driver by automatically decelerating the vehicle 12, which may be accomplished applying the friction brakes 30 of the vehicle 12. Of course, when the trailer 14 is attached to the vehicle 12, decelerating the vehicle 12 decelerates the trailer 14 and vice versa. Thus, instead of or in addition to applying the friction brakes 30 of the vehicle 12 independent of an input from the driver, the VCM 44 may automatically decelerate the vehicle 12 by applying the friction brakes 72 of the trailer 14 independent of an input from the driver.

Figure 2:
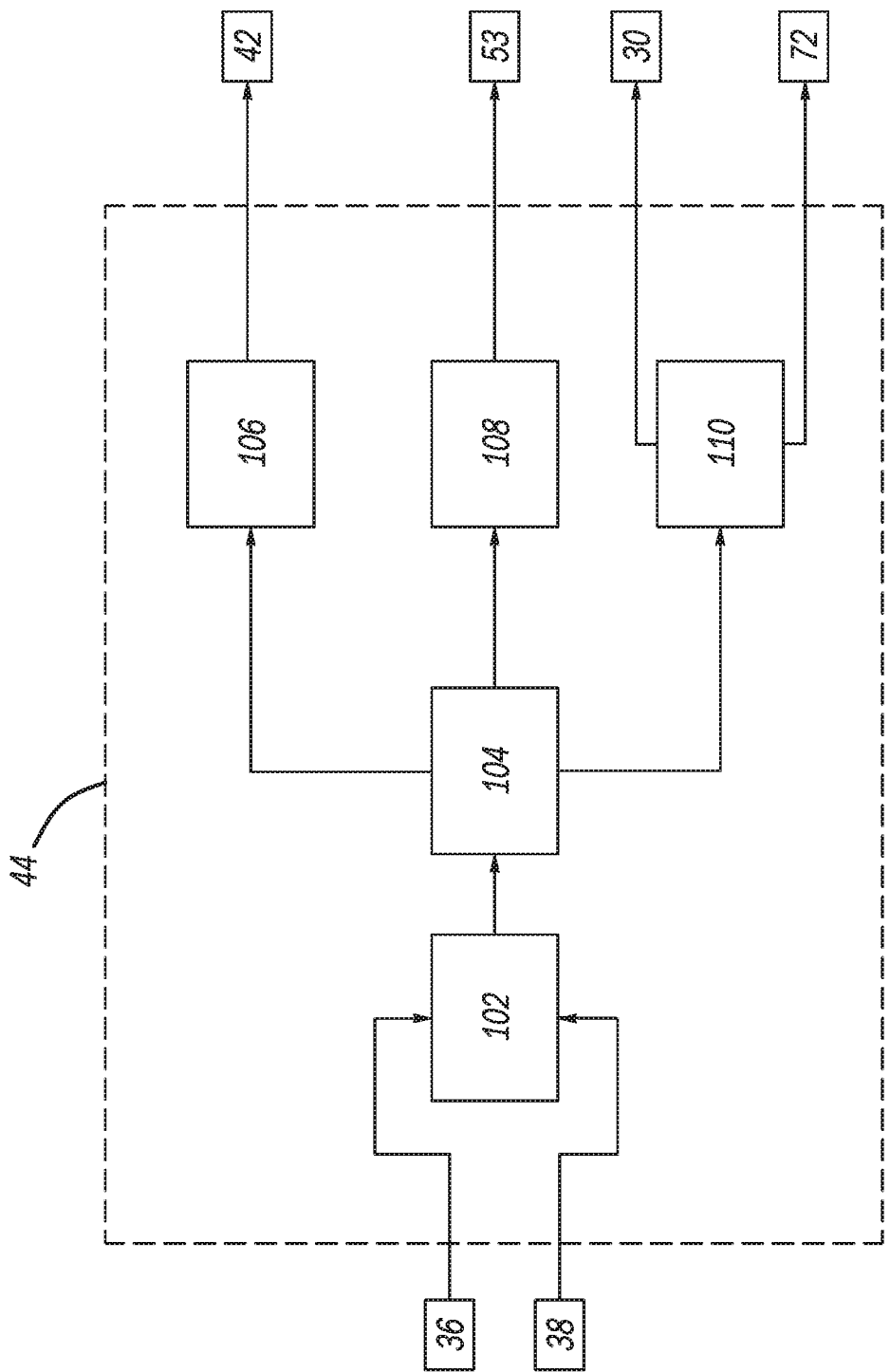
FIG. 2 is a functional block diagram of an example vehicle control system capable of utilizing the system and method disclosed herein.

Referring now to FIG. 2, an example implementation of the VCM 44 includes an estimated rate of change of the hitch angle module 102 and a curvature prediction module 104. The estimated rate of change of the hitch angle module 102 estimates a rate of change of the hitch angle 56 based on a turn angle of the right and left rear wheels 26 and 28, the speed of the vehicle 12 (which may be sensed at the center of rear axle 22), and angular velocity of the vehicle 12 (which may also be sensed at the center of rear axle 22). The estimated rate of change of the hitch angle module 102 receives the speed of the vehicle 12 from the wheel speed sensor 36. The estimated rate of change of the hitch angle module 102 receives the angular velocity of the vehicle 12 from the IMU of VCM 44.

Figure 3:
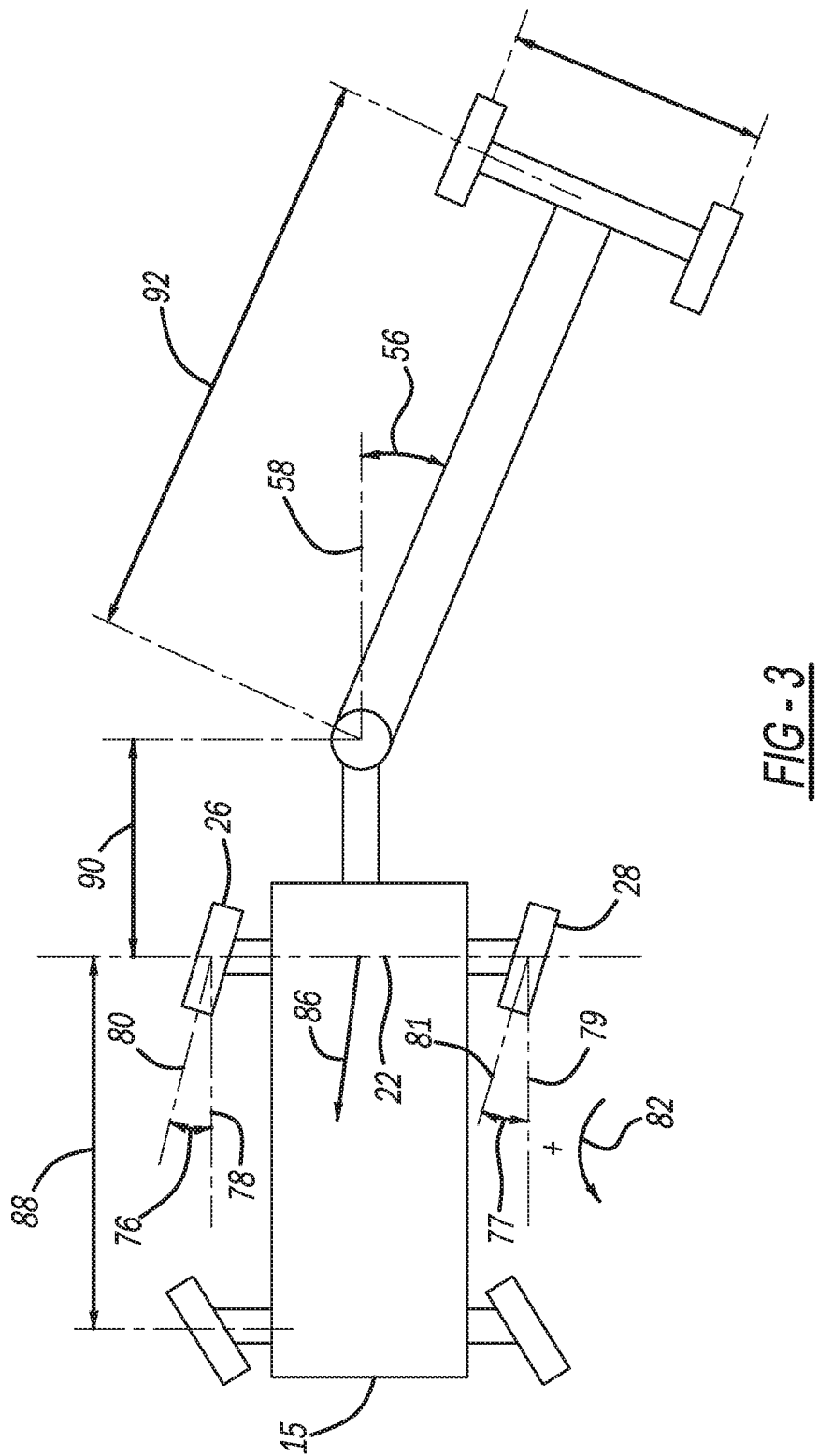
FIG. 3 illustrates parameters associated with an example vehicle system capable of utilizing the system and method disclosed herein.

The first rear-wheel steer angle of the vehicle 12 is labelled 76 in FIG. 3 and is an angle between a line 78 parallel to the longitudinal axis 58 of the vehicle 12 and a vertical plane 80 extending through a steered left rear wheel of the vehicle 12 (i.e., left rear wheel 26). The second rear-wheel steer angle of the vehicle 12 is labelled 77 in FIG. 3 and is an angle between a line 79 parallel to the longitudinal axis 58 of the vehicle 12 and a vertical plane 81 extending through a steered right rear wheel of the vehicle 12 (i.e., right rear wheel 28). The estimated rate of change of the hitch angle module 102 determines the rear-wheel steer angle 76 based on the steering wheel angle measured by the output from the rear steering angle sensor of active rear steering actuator 53. For example, when mounted to steering column 48, the estimated rate of change of the hitch angle module 102 may multiply the steering wheel angle by a conversion factor (i.e., a predetermined value) in order to obtain the rear-wheel steer angle 76.

The estimated rate of change of the hitch angle module 102 estimates the rate of change of the hitch angle 56 based on the rear-wheel steer angle 76, vehicle speed, and angular velocity of vehicle 12 using a kinematic model of the vehicle 12 and the trailer 14 (taken at a time $T_1$). The estimated rate of change of the hitch angle module 102 may estimate the rate of change of the hitch angle 56 using the kinematic model, and integrate the estimated rate of change with respect to a sampling time period associated with the estimated rate of change to obtain the estimated rate of change of the hitch angle. For example, the estimated rate of change of the hitch angle module 102 may estimate the rate of change of the hitch angle 56 using a relationship (1):

$$\dot{\theta} = \frac{V_C}{l_{tr}} \sin(\alpha - \theta_{prev}) - \omega \left( \frac{l_h}{l_{tr}} \cos\theta_{prev} + 1 \right) \quad (1)$$

where θ_dot is the estimated rate of change of the hitch angle 56, $\theta_{prev}$ is the previous hitch angle (as sensed by hitch 34 at $T_0$), α is the average of the first and second rear-wheel steer angles 76 and 77, ω is the angular velocity of the vehicle 12, Vc is the speed of the vehicle 12, lh is the distance from the rear axle 22 of the vehicle 12 to the trailer hitch 34 of the vehicle 12, and ltr is the distance from the trailer hitch 34 of vehicle 12 to the axle 68 of the trailer 14. The angular velocity of the vehicle 12 is indicated at 82 in FIG. 3, the speed of the vehicle 12 is indicated at 86 in FIG. 3, the wheelbase of the vehicle 12 is indicated at 88 in FIG. 3, the distance from the rear axle 22 of the vehicle 12 to the trailer hitch 34 of the vehicle 12 is indicated at 90 in FIG.

3, and the distance from trailer hitch 34 of vehicle 12 to the axle 68 of the trailer 14 is indicated at 92 in FIG. 3.

Figure 4:
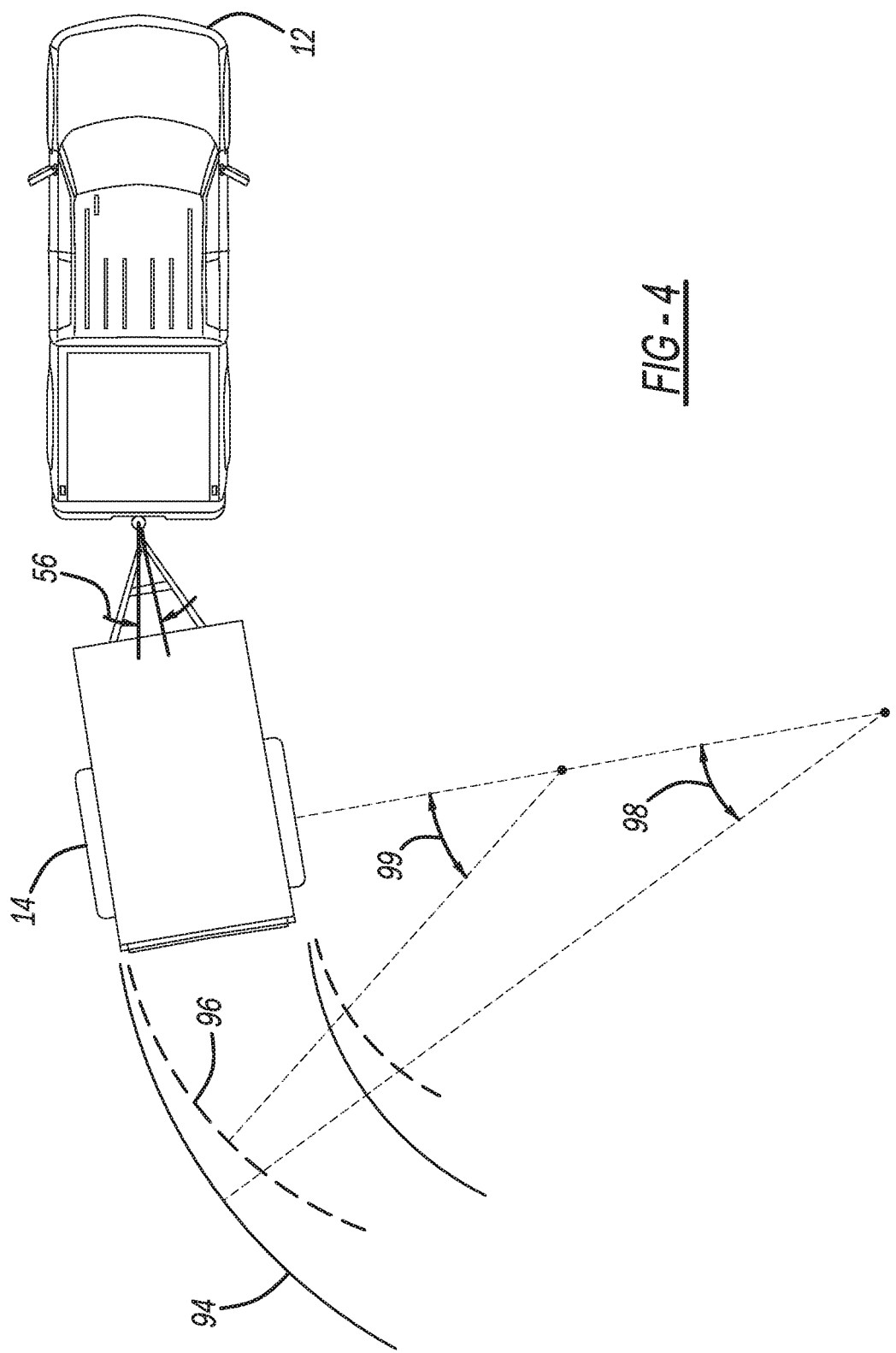
FIG. 4 illustrates parameters associated with an example vehicle system capable of utilizing the system and method disclosed herein.

With continued reference to FIGS. 2 through 4, the curvature prediction module 104 predicts a curvature radius of vehicle 12 and trailer 14 movement based on the previous hitch angle ($\theta_{prev}$) as well as a similar curvature radius based on the predicted hitch angle 56 based on trailer movement and the estimated rate of change of the hitch angle 56. For example, FIG. 4 shows a first path 94 indicating an instantaneous path of the trailer 14 based on the previous hitch angle ($\theta_{prev}$) as sensed by hitch 34. A second path 96 represents a predicted path of the trailer 14 based on the estimated rate of change of hitch angle 56. Line 98 represents a radius of curvature of the first path 94 and line 99 represents a radius of curvature of the second path 96. Curvature prediction module 104 will perform calculations to determine the second path 96. Calculations include various curvature dimensions of the vehicle 12 and of the trailer 14 and various angles of the vehicle 12 and trailer 14. In particular, the calculations determine a predicted curvature of vehicle 12 and trailer 14 at a selected distance (e.g., ten (10) feet) from the current location of the trailer 14 and the output produced by estimated rate of change of the hitch angle module 102, as shown in relationships (2) and (3):

$$R_B = (l_h \cos \alpha + l_{tr} \cos(\alpha - \theta_{prev}))/\sin(\alpha - \theta_{prev}) \quad (2)$$

$$R_Y = (l_h \cos \alpha + l_{tr} \cos(\alpha - \theta_d))/\sin(\alpha - \theta_d) \quad (3)$$

where RB is the constant curvature of trailer 14 movement based on the previous hitch angle ($\theta_{prev}$) as sensed by hitch 34, RY is the constant curvature of trailer 14 movement based on the output produced by estimated rate of change of the hitch angle module 102, θd is the predicted hitch angle (i.e., the integration of the estimated rate of change of the hitch angle 56, produced by module 102, at a selected distance from the current location of trailer 14), α is the rear-wheel steer angle 76, lh is the distance from the rear axle 22 of the vehicle 12 to the trailer hitch 34 of the vehicle 12, and ltr is the distance from the trailer hitch 34 of vehicle 12 to the axle 68 of the trailer 14.

The example implementation of the VCM 44 shown in FIG. 2 further includes a driver-assist module 106, a steering control module 108, and a brake control module 110. The driver-assist module 106 controls the user interface device 42 based on the corrected hitch angle in order to assist the driver in driving the vehicle 12. The driver assist module 106 may control the user interface device 42 to display a trailer reverse trajectory, display a combined rearview image, jackknife detection, and/or provide trailer sway alerts. For example, the driver assist module 106 may control the user interface device 42 to vibrate the steering wheel 46 and/or the driver's seat in order to warn the driver of potential jackknifing when the corrected hitch angle is greater than a predetermined angle. In another example, the driver assist module 106 may control the user interface device 42 to generate a viewable trailer reverse trajectory that provides virtual lines drawn on a camera view to assist a driver in controlling the motion of trailer 14 (discussed below). In another example, the driver assist module 106 may control the user interface device 42 to generate a combined rearview image that represents an area behind vehicle 12 while mitigating interference caused by the trailer 14 (discussed below).

The steering control module 108 controls the active rear steering actuator 53 based on the estimated rate of change of the hitch angle in order to assist the driver by automatically steering the vehicle 12 (e.g., by steering the vehicle 12 independent of an input from the driver such as the steering wheel angle measured by the rear steering angle sensor). The steering control module 108 may control the active rear steering actuator 53 based on the estimated rate of change of the hitch angle for jackknife prevention (e.g., while vehicle 12 moves trailer 14 in reverse) and obstacle avoidance (e.g., while vehicle 12 moves trailer 14 forward). For example, the steering control module 108 may control the active rear steering actuator 53 to decrease the rate of change of the hitch angle 56 when the corrected hitch angle is greater than the predetermined angle.

The steering control module 108 may control the active rear steering actuator 53 to decrease the rate of change of the hitch angle 56 by turning the left and right rear wheels 26 and 28 of the vehicle 12 left or right. For example, if the vehicle 12 and the trailer 14 are travelling rearward in FIG. 1 and the rate of change of the hitch angle 56 is greater than the predetermined angle, the steering control module 108 may instruct the active rear steering actuator 53 to turn at least the rear wheels 26 and 28 to the right. Turning the rear wheels 26 and 28 to the right (while the front wheels 24 simultaneously or additionally turn to the right) may substantially decrease the rate of change of the hitch angle 56 and thereby prevent the vehicle 12 and trailer 14 from jackknifing.

With continued reference to FIG. 2, the brake control module 110 controls the friction brakes 30 of the vehicle 12 and/or the friction brakes 72 of the trailer 14 based on the corrected hitch angle in order to assist the driver by automatically braking the vehicle 12 and/or the trailer 14 (e.g., by braking the vehicle 12 and/or the trailer 14 independent of an input from the driver such as a brake pedal position). The brake control module 110 may control the friction brakes 30 and/or 72 based on the corrected hitch angle for jackknife prevention. For example, the steering control module 108 may apply the friction brakes 30 and/or 72 to decelerate the vehicle 12 when the corrected hitch angle is greater than the predetermined angle. The steering control module 108 and/or the brake control module 110 may be referred to as an actuator control module.

Figure 5:
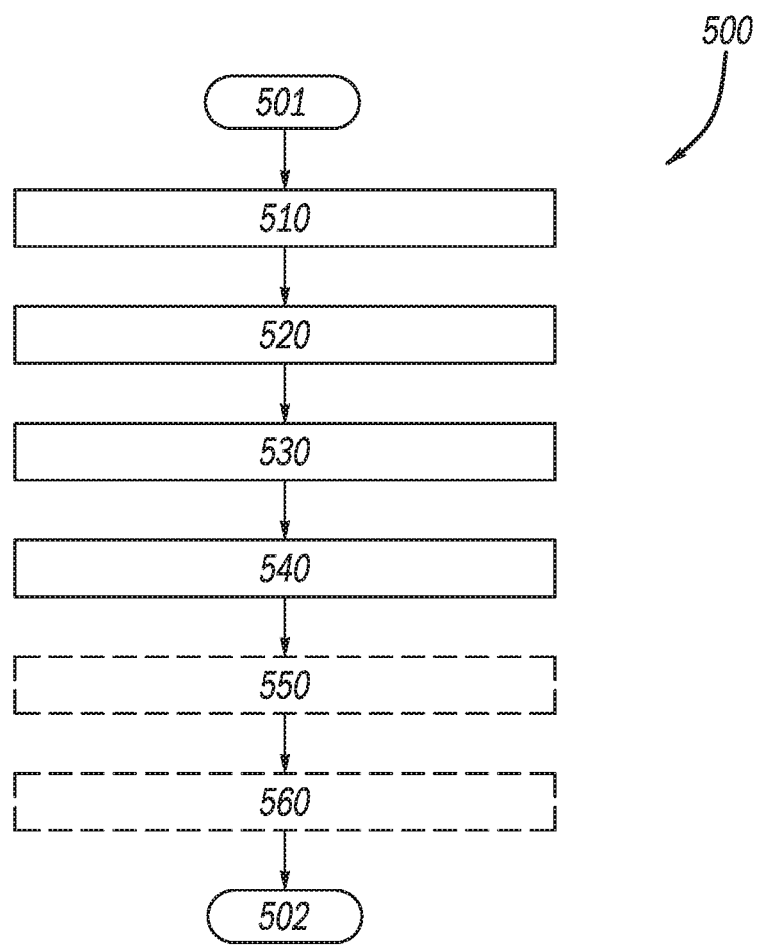
FIG. 5 is a flowchart illustrating an exemplary method according to the principles disclosed herein.

Referring now to FIG. 5, a method 500 for estimating the rate of change of the hitch angle 56 to assist in the control of a vehicle that includes active rear steering (ARS) capabilities. As discussed above, ARS is a chassis technology that provides the ability to turn the rear wheels of vehicle 12 in order to deliver greater stability and control under certain driving conditions and implementations.

Method 500 or parts thereof can be implemented in a computer program product (e.g., VCM 44, etc.) embodied in a computer readable medium and including instructions usable by one or more processors of one or more computers of one or more systems to cause the system(s) to implement one or more of the method steps. The computer program product may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program can be executed on one computer or on multiple computers in communication with one another.

The program(s) can be embodied on computer readable media, which can be non-transitory and can include one or more storage devices, articles of manufacture, or the like.

Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of carrying out instructions corresponding to one or more steps of the disclosed method.

Method 200 begins at 501 in which a vehicle operator (driver) begins to operate vehicle 12 in reverse and thus puts vehicle 12 in reverse gear. At step 510, the rear steering sensor embedded within active rear steering actuator 53 measures the angular position of the right and left rear wheels 26 and 28. In step 520, wheel speed sensor 36 measures the wheel speed of the left or right rear wheel 26 or 28. At 530, the estimated rate of change of the hitch angle module 102 estimates the rate of change of the hitch angle 56 based on the rear-wheel steer angle and the vehicle speed using the kinematic model of the vehicle 12 and the trailer 14. For example, the estimated rate of change of the hitch angle module 102 may estimate the rate of change of the hitch angle 56 using relationship (1) discussed above.

Figure 6:
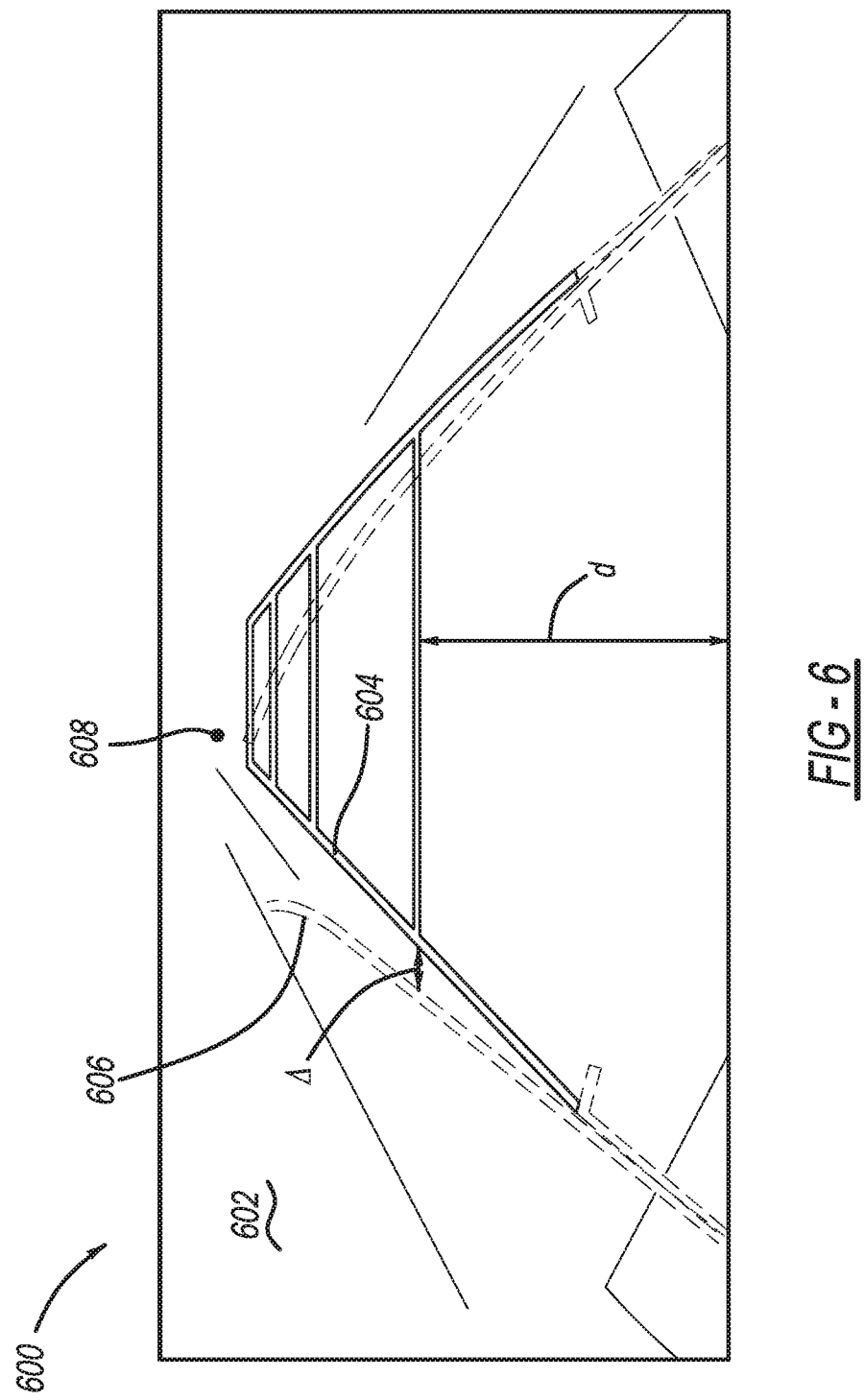
FIG. 6 shows an illustrative aspect of the flowchart of FIG. 5.

At step 540, the driver assist module 106 will control the user interface device 42 to generate a viewable trailer reverse trajectory view 602, which provides virtual lines drawn on a camera view to assist a driver in controlling the motion of trailer 14. For example, with additional reference to FIG. 6, the driver assist module 110 will produce view 600 that includes a first pair of guidelines 604 overlaid over the image area captured by camera 40, the first pair of guidelines 604 representing an instantaneous path of the trailer based on the previous hitch angle ($\theta_{prev}$). A second pair of guidelines 606 is also shown and represents a predicted path of the trailer based on a predicted path of the trailer 14 via the estimated rate of change of hitch angle 56. The first pair of guidelines 604 and the second pair of guidelines 606 can be visually distinguished at the display by a suitable marking, such as by different colors, different formats (dotted vs. solid), etc. Also shown for illustrative purposes is a selected location or destination 608 for the trailer which is reachable by a selected path that is not currently aligned with the instantaneous path. A distance d from the rear of the trailer is shown of illustrative purposes. The first pair of guidelines 604 and second pair of guidelines 606 are separated by an amount A at distance d. As the trailer moves backward (reducing d), the first pair of guidelines 604 (i.e., the instantaneous path) tends to adjust itself to align with the second pair of guidelines 606 (i.e., the predicted path).

Using the steering wheel 46 and the guidelines at the user interface device 42, the vehicle operator (user) can change the rear-wheel steer angle (a) of the vehicle 12 to adjust the second pair of guidelines path 606 (i.e., rotate the left and right rear wheels 26 and 28 to adjust the second pair of guidelines path 606). Thus, this will cause the first pair of guidelines 604 to change due to its tendency to align itself with the second pair of guidelines 606 during back-up. The driver (via the steering wheel) changes the second pair of guidelines 606 in order to bring the first pair of guidelines 604 (which is continually aligning along the second pair of guidelines 606) along the selected or desired path for the trailer 14 to reach the selected destination 608. The first pair of guidelines 604 and second pair of guidelines 606 therefore instruct the vehicle operator (driver) on a selected steering angle that backs the trailer 14 into the desired location or destination 608. If the vehicle operator turns steering wheel 46 to hard, such that the rear-wheel steer angle ($\alpha$) of the vehicle 12 becomes greater than a predetermined reference hitch angle ($\theta_{ref}$), the driver assist module 106 can also provide one or more trailer sway alerts (discussed above). The predetermined reference hitch angle ($\theta_{ref}$) may be one that has a high potential to cause jackknifing of the trailer 14 (e.g., $\theta_{ref} > 70$ degrees).

In addition or alternatively, in this step, the driver assist module 106 will control the user interface device 42 to generate a combined rearview image (not shown), obtained using a camera mounted to the rear end 16 of vehicle 12 (not shown) in addition to camera 40, which is combined with various graphics to represent an area behind vehicle 12 while mitigating interference caused by the trailer 14 (commonly known a an invisible trailering technique). For example, a first image can be obtained by a rear-facing vehicle camera to show the front end 62 of trailer 14. A second image can also be obtained by camera 40 of trailer 14. Moreover, the second image is overlaid onto the first image at a predesignated image overlay area. In order to cause the second image to fit this overlay area, the second image can be repositioned and/or resized on the first image at an image overlay position, via a variety of known techniques, so as to not create a distorted appearance of the combined rearview image. The overlay area can be based on the estimated rate of change of hitch angle 56 output from the estimated rate of change of the hitch angle module 102 as well as trailer dimension information (e.g., trailer length). For example, the overlay area may be articulated within the first image in such a way that the overlay area will correspond with the articulation of the second image (of the area behind trailer 14). Furthermore, once the first and second images are pieced together, various graphics can be overlaid on the combined image to highlight any distinctive roadway features such as, for example, lane markers and road edges.

In optional step 550, when the vehicle operator (driver) desires to enable vehicle 12 to autonomously navigate itself toward destination 608, the steering control module 108 will control the active rear steering actuator 53 based on the estimated rate of change of the hitch angle 56 in order to assist the vehicle operator (driver) by automatically steering the vehicle 12. For example, if the estimated rate of change of the hitch angle 56 is determined to be greater than the predetermined reference hitch angle, steering control module 108 may control the active rear steering actuator 53 based on the estimated rate of change of the hitch angle in order to prevent jackknifing of trailer 14. Moreover, in order to prevent jackknifing and obstacle avoidance, steering control module 108 may control the active rear steering actuator 53 to decrease the rate of change of the hitch angle 56 (to be less than the predetermined reference hitch angle) by turning the left and right rear wheels 26 and 28 of the vehicle 12 left or right. The vehicle operator (driver) may trigger activation of steering control module 108 via one or more virtual buttons provided via the user interface device 42. At optional step 560, brake control module 110 works in conjunction with steering control module 108 to control the friction brakes 30 of the vehicle 12 and/or the friction brakes 72 of the trailer 14 to assist the driver by automatically braking the vehicle 12 and/or the trailer 14 (e.g., by braking the vehicle 12 and/or the trailer 14 independent of an input from the driver such as a brake pedal position). The brake control module 110 may control the friction brakes 30 and/or 72 based on the estimated rate of change of the hitch angle in order to prevent jackknifing of trailer 14. As follows, the brake control module 110 assists with the control of vehicle 12 while the steering function of steering control module 108 is being carried out. The method 500 ends at 502.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 108(f) unless an element is expressly recited using the phrase "means for," or in the case of a method claim using the phrases "operation for" or "step for" in the claim.

What is claimed is:

1. A system comprising:
    a memory configured to store one or more executable instructions and a processor configured to execute the executable instructions, wherein the executable instructions enable the processor to:
    estimate a rate of change of a hitch angle between a trailer and a vehicle in response to a current steer angle of a plurality of rear wheels of the vehicle and a speed of the vehicle based on the following relationship:

$$\dot{\theta} = \frac{V_C}{l_{tr}}\sin(\alpha - \theta_{prev}) - \omega\left(\frac{l_h}{l_{tr}}\cos\theta_{prev} + 1\right)$$

where θ_dot is the estimated rate of change of the hitch angle, $\theta_{prev}$ is a previous hitch angle, α is the current steer angle of the plurality of rear wheels, ω is an angular velocity of the vehicle, Vc is the speed of the vehicle, lh is a distance from a rear axle of the vehicle to a trailer hitch of the vehicle, and ltr is a distance from the trailer hitch of the vehicle to an axle of the trailer; and
    at least one of:
        control a user interface device to display a trailer reverse trajectory view based on the estimated rate of change of the hitch angle, the trailer reverse trajectory view including one or more virtual lines to assist a driver to control motion of the trailer;
        control an active rear steering actuator of the vehicle based on the estimated rate of change of the hitch angle; and
        control at least one of a friction brake of the vehicle and a friction brake of the trailer based on the estimated rate of change of the hitch angle.

2. The system of claim 1, wherein the executable instructions further enable the processor to:
    predict a first curvature radius of a movement of the vehicle and the trailer based on a previous hitch angle; and
    predict a second curvature radius of the movement of the vehicle and the trailer based on the estimated rate of change of the hitch angle.

3. The system of claim 2, wherein the executable instructions further enable the processor to predict the first curvature radius and the second curvature radius based on the following relationships:

$R_B = (l_h \cos \alpha + l_{tr} \cos(\alpha - \theta_{prev}))/\sin(\alpha - \theta_{prev})$ $R_Y = (l_h \cos \alpha + l_{tr} \cos(\alpha - \theta_d))/\sin(\alpha - \theta_d)$ where RB is the first curvature radius, RY is the second curvature radius, θd is a predicted hitch angle at a selected distance from a current location of the trailer, α is current steer angle of the plurality of rear wheels, lh is the distance from the rear axle of the vehicle to the trailer hitch of the vehicle, and ltr is the distance from the trailer hitch of the vehicle to the axle of the trailer.

4. The system of claim 1, wherein the executable instructions enable the processor to generate the trailer reverse trajectory view based on the estimated rate of change of the hitch angle.

5. The system of claim 1, wherein the executable instructions enable the processor to control the active rear steering actuator of the vehicle based on the estimated rate of change of the hitch angle.

6. The system of claim 1, wherein the executable instructions enable the processor to control at least one of the friction brake of the vehicle and the friction brake of the trailer based on the estimated rate of change of the hitch angle.

7. A non-transitory machine-readable medium having stored thereon executable instructions, that, when provided to a processor and executed thereby, cause the processor to:
estimate a rate of change of a hitch angle between a trailer and a vehicle in response to a current steer angle of a plurality of rear wheels of the vehicle and a speed of the vehicle based on the following relationship:

$$\dot{\theta} = \frac{V_C}{l_{tr}}\sin(\alpha - \theta_{prev}) - \omega\left(\frac{l_h}{l_{tr}}\cos\theta_{prev} + 1\right)$$

where θ_dot is the estimated rate of change of the hitch angle, $\theta_{prev}$ is a previous hitch angle, α is the current steer angle of the plurality of rear wheels, ω is an angular velocity of the vehicle, Vc is the speed of the vehicle, lh is a distance from a rear axle of the vehicle to a trailer hitch of the vehicle, and ltr is a distance from the trailer hitch of the vehicle to an axle of the trailer; and at least one of:
control a user interface device to display a trailer reverse trajectory view based on the estimated rate of change of the hitch angle, the trailer reverse trajectory view providing a virtual line on a camera view to assist a driver with controlling motion of the trailer;
control an active rear steering actuator of the vehicle based on the estimated rate of change of the hitch angle; and
control at least one of a friction brake of the vehicle and a friction brake of the trailer based on the estimated rate of change of the hitch angle.

8. The non-transitory machine-readable medium of claim 7, wherein the executable instructions, when executed by the processor, further cause the processor to:
predict a first curvature radius of a movement of the vehicle and the trailer based on a previous hitch angle; and
predict a second curvature radius of the movement of the vehicle and the trailer based on the estimated rate of change of the hitch angle.

9. The non-transitory machine-readable medium of claim 8, wherein the executable instructions, when executed by the processor, further cause the processor to predict the first curvature radius and the second curvature radius based on the following relationships:

$R_B = (l_h \cos\alpha + l_{tr}\cos(\alpha - \theta_{prev}))/\sin(\alpha - \theta_{prev})$ $R_Y = (l_h \cos\alpha + l_{tr}\cos(\alpha - \theta_d))/\sin(\alpha - \theta_d)$ where RB is the first curvature radius, RY is the second curvature radius, θd is a predicted hitch angle at a selected distance from a current location of the trailer, α is the current steer angle of the plurality of rear wheels, lh is the distance from the rear axle of the vehicle to the trailer hitch of the vehicle, and ltr is the distance from the trailer hitch of the vehicle to the axle of the trailer.

10. The non-transitory machine-readable medium of claim 7, wherein the executable instructions, when executed by the processor, further cause the processor to control the user interface device to display the trailer reverse trajectory view based on the estimated rate of change of the hitch angle.

11. The non-transitory machine-readable medium of claim 7, wherein the executable instructions, when executed by the processor, further cause the processor to control the active rear steering actuator based on the estimated rate of change of the hitch angle.

12. The non-transitory machine-readable medium of claim 7, wherein the executable instructions, when executed by the processor, further cause the processor to control at least one of the friction brake of the vehicle and the friction brake of the trailer based on the estimated rate of change of the hitch angle.

13. A method comprising:
estimating a rate of change of a hitch angle between a trailer and a vehicle in response to a current angle of a plurality of rear wheels of the vehicle and a speed of the vehicle based on the following relationship:

$\dot{\theta} = V_C/l_{tr} \sin(\alpha - \theta_{prev}) - \omega(l_h/l_{tr} \cos\theta_{prev} + 1)$ where θ_dot is the estimated rate of change of the hitch angle, $\theta_{prev}$ is a previous hitch angle, α is the current steer angle of the plurality of rear wheels, ω is an angular velocity of the vehicle, Vc is the speed of the vehicle, lh is a distance from a rear axle of the vehicle to a trailer hitch of the vehicle, and ltr is a distance from the trailer hitch of the vehicle to an axle of the trailer; and at least one of:
controlling a user interface device to display a trailer reverse trajectory view based on the estimated rate of change of the hitch angle, the trailer reverse trajectory view providing a virtual line on a camera view to assist a driver with controlling motion of the trailer;
controlling an active rear steering actuator of the vehicle based on the estimated rate of change of the hitch angle; and
controlling at least one of a friction brake of the vehicle and a friction brake of the trailer based on the estimated rate of change of the hitch angle.

14. The method of claim 13, further comprising:
predicting a first curvature radius of a movement of the vehicle and the trailer based on a previous hitch angle; and
predicting a second curvature radius of the movement of the vehicle and the trailer based on the estimated rate of change of the hitch angle.

15. The method of claim 14, further comprising predicting the first curvature radius and the second curvature radius based on the following relationships:

$R_B = (l_h \cos\alpha + l_{tr}\cos(\alpha - \theta_{prev}))/\sin(\alpha - \theta_{prev})$ $R_Y = (l_h \cos\alpha + l_{tr}\cos(\alpha - \theta_d))/\sin(\alpha - \theta_d)$ where RB is the first curvature radius, RY is the second curvature radius, θd is a predicted hitch angle at a selected distance from a current location of the trailer, α is the current steer angle of the plurality of rear wheels, lh is the distance from the rear axle of the vehicle to the trailer hitch of the vehicle, and ltr is the distance from the trailer hitch of the vehicle to the axle of the trailer.

16. The method of claim 13, further comprising controlling the user interface device to display the trailer reverse trajectory view based on the estimated rate of change of the hitch angle.

17. The method of claim 13, further comprising controlling the active rear steering actuator of the vehicle based on the estimated rate of change of the hitch angle.

* * * * *